(12) United States Patent
Xavier

(10) Patent No.: US 9,235,711 B1
(45) Date of Patent: Jan. 12, 2016

(54) SYSTEMS, METHODS AND DEVICES FOR PROVIDING VISUAL PRIVACY TO MESSAGES

(71) Applicant: Brandon Oliver Xavier, Toronto (CA)

(72) Inventor: Brandon Oliver Xavier, Toronto (CA)

(73) Assignee: VOXIENCE S.A.R.L., Luxembourg (LU)

( * ) Notice: Subject to any disclaimer, the term of this patent is extended or adjusted under 35 U.S.C. 154(b) by 0 days.

(21) Appl. No.: 14/313,361

(22) Filed: Jun. 24, 2014

(51) Int. Cl.
  *G06F 21/10* (2013.01)
  *G06F 21/60* (2013.01)
  *G06T 5/00* (2006.01)
  *G06T 7/00* (2006.01)

(52) U.S. Cl.
  CPC .............. *G06F 21/60* (2013.01); *G06T 5/003* (2013.01); *G06T 7/0081* (2013.01)

(58) Field of Classification Search
  CPC ....................................................... G06F 21/10
  See application file for complete search history.

(56) References Cited

U.S. PATENT DOCUMENTS

| | | | |
|---|---|---|---|
| 6,650,428 B1* | 11/2003 | Hernandez | 358/1.13 |
| 7,477,794 B2* | 1/2009 | Lefebvre et al. | 382/240 |
| 8,370,639 B2 | 2/2013 | Azar et al. | |
| 8,374,480 B2* | 2/2013 | Liu | 386/210 |
| 2007/0183000 A1* | 8/2007 | Eisen et al. | 358/452 |
| 2011/0202598 A1 | 8/2011 | Evans et al. | |
| 2012/0054838 A1 | 3/2012 | Kim et al. | |
| 2012/0250951 A1 | 10/2012 | Chen | |
| 2013/0194301 A1 | 8/2013 | Robbins et al. | |
| 2013/0308866 A1* | 11/2013 | Lin et al. | 382/195 |
| 2013/0308874 A1 | 11/2013 | Togashi et al. | |
| 2014/0177953 A1* | 6/2014 | Shevchenko | 382/164 |

* cited by examiner

*Primary Examiner* — Teshome Hailu
*Assistant Examiner* — Thanh Le
(74) *Attorney, Agent, or Firm* — Bereskin & Parr LLP; Isis Caulder

(57) ABSTRACT

At least one of the embodiments described herein relate generally to a method of providing visual privacy for a message sent to at least one device. The method may include the acts of: receiving the message at the at least one device, the message including content and a privacy indicator; converting the content to a content image; applying a blur function to the content image to generate a blurred content image; generating an obscured layer from the blurred content image; partitioning the content image into one or more segments to generate a content layer, the one or more segments each having one or more segment attributes; aligning the obscured layer with the content layer, wherein selecting an area on the obscured layer corresponding to the one or more segments removes the obscured layer for the one or more segments based on the one or more segment attributes.

20 Claims, 16 Drawing Sheets

SYSTEMS, METHODS AND DEVICES FOR PROVIDING VISUAL PRIVACY TO MESSAGES

FIELD

The described, embodiments relate generally to systems and methods for providing visual privacy to messages.

BACKGROUND

Electronic messaging has become a primary mode of communication between parties. The growth in messaging services has been fueled by the increase in mobile electronic devices, such as smartphones, tablets, and the like. Messaging services provide users with the ability to transmit and receive content such as texts, images and videos from electronic devices.

Some messaging services have been created for transmitting and receiving sensitive or private content between its users. These messaging services employ techniques to limit traceability of messages distributed through the service, for example by employing self-destructing or vanishing messages. In this approach, records of the message or message content distributed through the service are removed from the receiver's electronic device and from the server managed by the messaging service once the message has been opened and read by the receiver.

Other messaging services attempt to mask the message content by limiting the receiver's ability to view the message or by restricting the receiver's ability to capture the message content. For example, some messaging services mask the message content in order to limit the receiver's ability to take a screenshot of the message content from their electronic device. These messaging services may blur or blacken the message content and employ a "peephole" or "spyhole", through which the receiver can view the message. This approach, however, has various limitations. For example, the receiver must continuously select an area on the screen of the electronic device with their finger in order to deploy the peephole. The accuracy of placing the peephole may vary depending on the size of the receiver's finger. Additionally, the size of the peephole limits the receiver to view only that portion of the message revealed by the peephole at any given time. This approach increases the amount of time required for a receiver to view message content.

Known messaging services for distributing sensitive or private content do not allow the sender to vary or influence the user experience of the receiver. For example, a sender may wish to send a message containing sensitive message content to various receivers. The sender may have a high degree of trust with some receivers of the message, and a low degree of trust with other receivers of the message. In this case, a sender may provide trusted receivers with a higher degree of latitude in viewing the message content, and less trusted receivers with a lower degree of latitude in viewing the message content.

In other instances, a sender may wish to vary specific portions of sensitive message content. For example, a sender transmitting banking information through the messaging service may wish to apply a higher degree of privacy to an account number contained in the message content, and a lower degree of privacy to the remainder of the message content.

Known messaging services for distributing sensitive or private message content may not permit the receiver of the message to increase the degree of visual privacy attributed to the message. For example, a trusted receiver may receive sensitive message content and may have been provided a high degree of latitude from the message sender. The receiver, however, may be in a crowded location (e.g., on a crowded train), and may wish to increase the degree of privacy attributed to the sensitive message content such that onlookers cannot easily view the sensitive message content displayed on the electronic device.

Some messaging services mask sensitive message content by applying an opaque or blurred layer on top of the content at the electronic device of the sender, or at the server managed by the messaging server. This approach, however, unnecessarily increases the data required to transmit and receive the message over a communication network.

SUMMARY

In a first aspect, some embodiments of the invention provide a method of providing visual privacy for a message sent to at least one device comprising receiving the message at the at least one device, where the message includes content and a privacy indicator, converting the content to a content image; applying a blur function to the content image to generate a blurred content image; partitioning the content image into one or more segments to generate a content layer, the one or more segments each having one or more segment attributes, aligning the obscured layer with the content layer, wherein selecting an area on the obscured layer corresponding to the one or more segments removes the obscured layer for the one or more segments based on the one or more segment attributes.

In another broad aspect, the obscured layer comprises a first face and a second face, and wherein the first face and second face each comprise a front side and rear side.

In another broad aspect, the front side of the first face includes the blurred content image and the front side of the second face is a mirror image of the front side of the first face.

In another broad aspect, the obscured layer is generated by abutting the rear side of the first face with the rear side of the second face.

In another broad aspect, the privacy indicator is based on the blur function and segment attributes.

In another broad aspect, the blur function and the segment attributes are selectable by a sender of the message.

In another broad aspect, the privacy indicator can be modified by the receiver of the message.

In another broad aspect, the one or more segment attributes comprise at least one of: a rotational rate, a rotational axis, rotational duration, segment size, segment coordinates, segment shape, segment boundaries, obscured layer selection duration, obscured layer removal rate and obscured layer removal duration.

In another broad aspect, the rotational axis is selected from a group consisting of: a north-south axis, an east-west axis, a north-west and south-east axis, or a north-east and south west axis.

In another broad aspect, the blur function comprises a blur intensity and a blur filter.

In another broad aspect, the content is video content, and wherein only a frame of the video content is converted to the content image.

In another broad aspect, the blur filter is selected from a group consisting of a Gaussian blur, a spiral blur, a motion blur, or a pixelize blur.

In another broad aspect, some embodiments of the invention provide a device configured to receive a message, comprising: a memory configured to store a message that includes content and a privacy indicator; and a processor configured to: convert the content to a content image; apply a blur function to the content image to generate a blurred content image; generate an obscured layer from the blurred content image; partition the content image into one or more segments to generate a content layer, the one or more segments each having one or more segment attributes; align the obscured layer with the content layer, wherein selecting an area on the obscured layer corresponding to the one or more segments removes the obscured layer for the one or more segments based on the one or more segment attributes.

In another broad aspect, some embodiments of the invention provide a system of providing privacy for a message transmitted between devices using a communication network, the system comprising: a sender device configured to transmit the message, the message including content, a privacy indicator, and at least one receiver identifier; at least one server configured to: receive the message from the sender device, the message comprising content, a privacy indicator, and at least one receiver identifier; route the message from the sender device to the at least one receiver device based on the at least one receiver identifier; receive an acknowledgement receipt from the receiver device; at least one receiver device configured to: receive the message; transmit an acknowledgment receipt; convert the content to a content image; apply a blur function to the content image to generate a blurred content image; generate an obscured layer from the blurred content image; partition the content image into one or more segments to generate a content layer, the one or more segments each having one or more segment attributes; align the obscured layer with the content layer, wherein selecting an area on the obscured layer corresponding to the one or more segments removes the obscured layer for the one or more segments based on the one or more segment attributes.

BRIEF DESCRIPTION OF THE DRAWINGS

A preferred embodiment of the present invention will now be described in detail with reference to the drawings, in which.

DESCRIPTION OF EXEMPLARY EMBODIMENTS

Figure 1A:
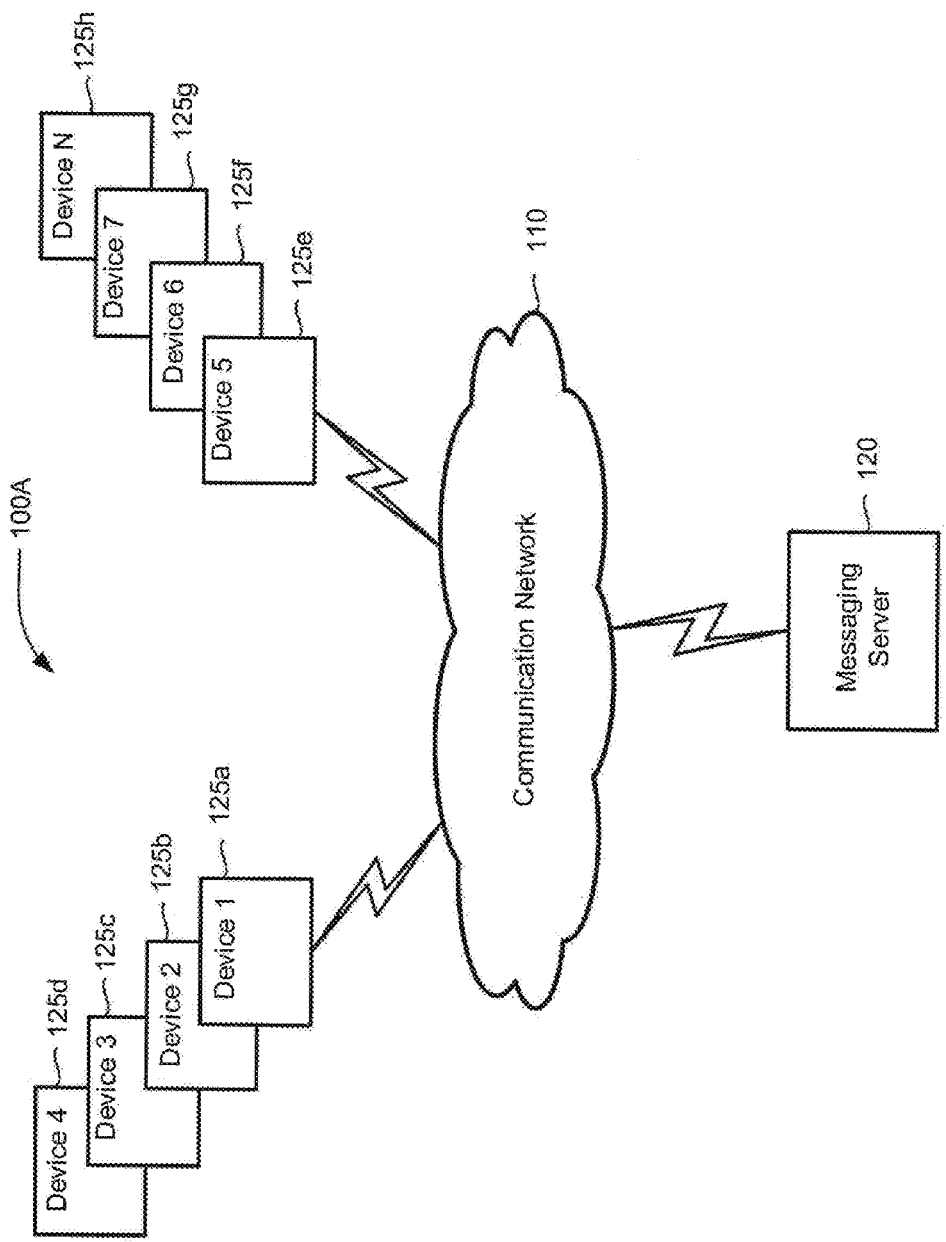
FIG. 1A is a block diagram illustrating a messaging system for providing visual privacy in accordance with at least one example embodiment.

It will be appreciated that numerous specific details are set forth in order to provide a thorough understanding of the example embodiments described herein. However, it will be understood by those of ordinary skill in the art that the embodiments described herein may be practiced without these specific details. In other instances, well-known methods, procedures and components have not been described in detail so as not to obscure the embodiments described herein.

The embodiments of the systems and methods described herein may be implemented in hardware or software, or a combination of both. These embodiments may be implemented in computer programs executing on programmable computers, each computer including at least one processor, a data storage system (including volatile memory or non-volatile memory or other data storage elements or a combination thereof), and at least one communication interface. For example, and without limitation, the various programmable computers or electronic devices may be a server, network appliance, set-top box, embedded device, computer expansion module, personal computer, laptop, mobile telephone, smartphone or any other computing device capable of being configured to carry out the methods described herein.

Each program may be implemented in a high level procedural or object oriented programming or scripting language, or both, to communicate with a computer system. However, alternatively the programs may be implemented in assembly or machine language, if desired. The language may be a compiled or interpreted language. Each such computer program may be stored on a non-transitory computer readable storage medium (e.g. read-only memory, magnetic disk, optical disc). The storage medium so configured causes a computer to operate in a specific and predefined manner to perform the functions described herein.

While particular combinations of various functions and features are expressly described herein, other combinations of these features and functions are possible that are not limited by the particular examples disclosed herein, and these are expressly incorporated within the scope of the present invention.

The various embodiments described herein generally relate to systems and methods for providing visual privacy to messages. Messages refer generally to electronic messages transmitted and received over a communication network. Visual privacy generally refers to obscuring message content on the electronic device of the receiver. Messages generally comprise content, for example an image, text or video, and a privacy indicator. The privacy indicator corresponding to a message is based on a blur function and segment attributes. In some embodiments, the blur function and segment attributes are selectable by the sender of the message. In some embodiments, a sender may transmit a message to multiple recipients, where each recipient may have a different privacy indicator. In other embodiments, the receiver can increase the visual privacy established by the sender of the message.

In some embodiments, the receiver may select an area of the display of the electronic device corresponding to one or more segments in order to reveal the message content for the one or more segments. The message content is revealed according to the segment attributes for the one or more segments.

In some embodiments, segments attributes can relate to the physical size and shape of the segment. In other embodiments, segment attributes can relate to a rotational rate, rotational axis, or a rotational duration of the segment. In yet other embodiments, segment attributes can relate to the duration in which the receiver selects an area on the display of the electronic device, or the rate or duration in which the message content is revealed.

The method of providing visual privacy to messages first converts the message content to an image. For example, message content comprising text message is converted to an image of the text. Message content comprising video converts a frame of the video to an image. A blur function is then applied to the image to generate a blurred content image. The blur function may include a blur filter and blur intensity. A blur filter includes, for example, a Gaussian-blur, pixelize-blur, spiral-blur, or motion-blur. Blur intensity generally relates to the pixel-radius scale, which can be varied in order to alter the intensity of the blur.

An obscured layer is generated from the blurred content image. In some embodiments, the obscured layer comprises two faces, a first face and a second face. In some embodiments the blurred content image is applied to the first face, and a mirror image of the blurred content image is applied to the second face.

Implementing a privacy indicator that is selectable by a sender of a message, as described in the following embodiments, may have several advantages. A sender of a message can influence and control the user experience for each receiver viewing the message content. A trusted receiver may have a higher degree of latitude in viewing the message content, whereas a less trusted receiver may have a lower degree of latitude in viewing the message content. Furthermore, implementing the privacy indicator at the receiver's electronic device reduces the amount of data required to transmit or receive the message over a communication network. Additionally, implementing an obscured layer that is removed based on segment attributes may have several advantages. For example, each segment can operate independently of other segments, allowing the sender to customize the viewing experience of the receiver. The receiver can select multiple segments concurrently to reveal multiple segments of the message content.

Reference is first made to FIG. 1A, which illustrates system 100A. System 100A comprises a plurality of electronic devices 125a-125h, messaging server 120, and communication network 110.

Electronic devices 125a-125h (also referred herein as a device or devices) may include any electronic device comprising a touchscreen and capable of communication over a communications network, such as, cellular phones, smart phones, tablets, wireless organizers, personal digital assistants, computers, laptops, Internet appliances and the like.

Electronic device 125a represents a first electronic device, electronic device 125b represents a second electronic device, electronic device 125c represents a third electronic device, electronic device 125d represents a fourth electronic device, electronic device 125e represent a fifth electronic device, electronic device 125f represents a sixth electronic device, electronic device 125g represents a seventh electronic device, and electronic device 125h represents an $n^{th}$ electronic device.

Messaging server 120 may include at least one computer server equipped with a processor and memory storing, for example, a database or file system and computer executable program code as described herein. Messaging server 120 is configured to route messages sent from a sender's electronic device to a receiver's electronic device via communication network 110. A database on messaging server 120 may contain records for correlating a user account corresponding to the messaging service with a device identifier corresponding to the user's electronic device.

Communication network 110 connects electronic devices 125a-125h to messaging server 120. Communication network 110 may be any network or network components capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WIMAX), SS7 signaling network, fixed line, local area network (LAN), wide area network (WAN), a direct point-to-point connection, mobile data networks (e.g., Universal Mobile Telecommunications System (UMTS), 3GPP Long-Term Evolution Advanced (LTE Advanced), Worldwide Interoperability for Microwave Access (WiMAX), etc.), and others, including any combination of these.

Figure 1B:
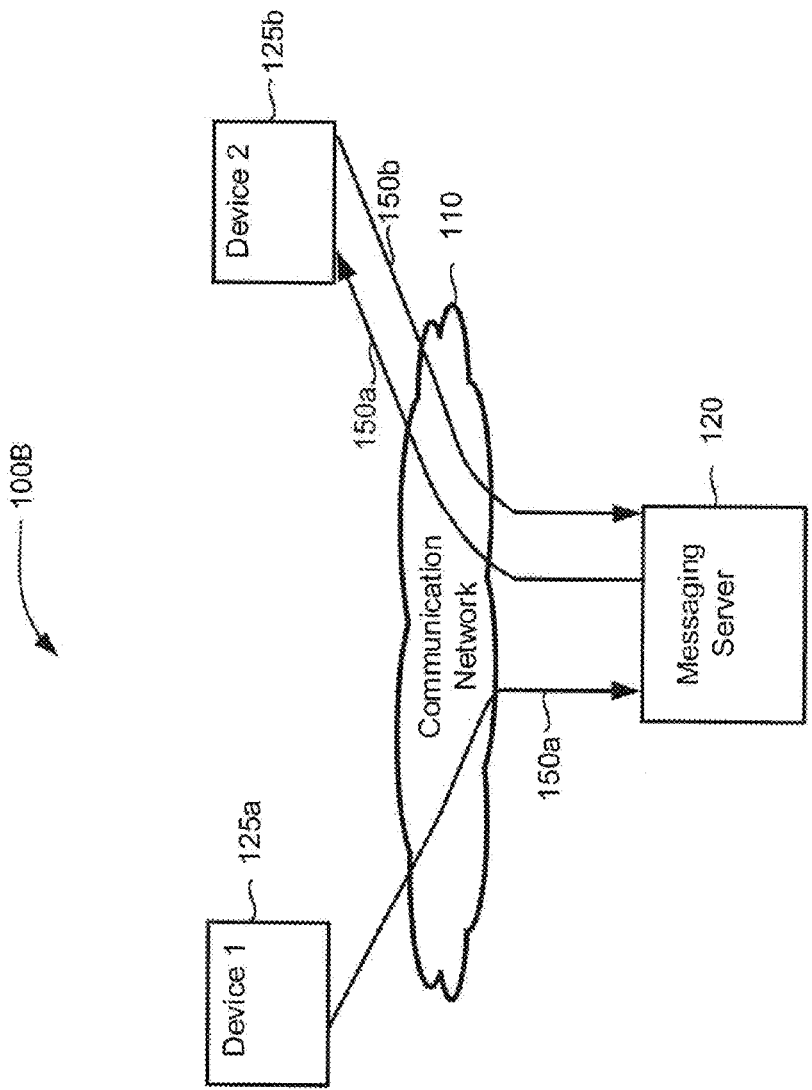
FIG. 1B is a block diagram illustrating a messaging system for providing visual privacy in accordance with at least one example embodiment.

Reference is next made to FIG. 1B, which illustrates an example data flow of system 100B. System 100B comprises a sender's electronic device 125a, a receiver's electronic device 125b, messaging server 120 and communication network 110.

In some embodiments, each user of the messaging service requires an account with the messaging service in order to transmit and receive messages. The account uses an identifier (herein after referred to as an account identifier), such as a username or email address to identify a user of the messaging service. For additional security, the messaging service may also require an image of the user's face to be associated with the account and stored on the electronic device. In some embodiments, the receiver of a message may be authenticated through facial recognition before gaining access to a received message. For example, the messaging service may continuously compare the image of the user's face associated with the account with the face of the user accessing the message.

Sender's electronic device 125a transmits a message 150a to a first receiver's electronic device 125b. The sender may address the receiver using the receiver's account identifier associated with the messaging service. Account identifiers may include a receiver's username for the messaging service, an email address, a personal identification number (PIN), or any other suitable identifier. Messaging server 120 routes the message 150a to the receiver's electronic device 125b by correlating the respective account identifier 165 and a device identifier associated with the receiver's electronic device. Device identifiers may include a mobile directory number (MDN), mobile identification number (MIN), international mobile subscriber number (IMSI), electronic serial number (ESN) or any other suitable identifier associated with an electronic device or a subscriber identity module (SIM).

Message 150a is received at the receiver's electronic device 125b. Message 150a may be encrypted at the sender's electronic device 125a, and decrypted by the receiver's electronic device 125b, (for example, using an encryption technique such as Data Encryption Standard (DES), Triple DES, or Advanced Encryption Standard (AES)). The message 150a may comprise message content and a privacy indicator. Receiver electronic device 125b may transmit an acknowledgement 150b back the messaging server 120 indicating successful receipt of message 150a.

Figure 1C:
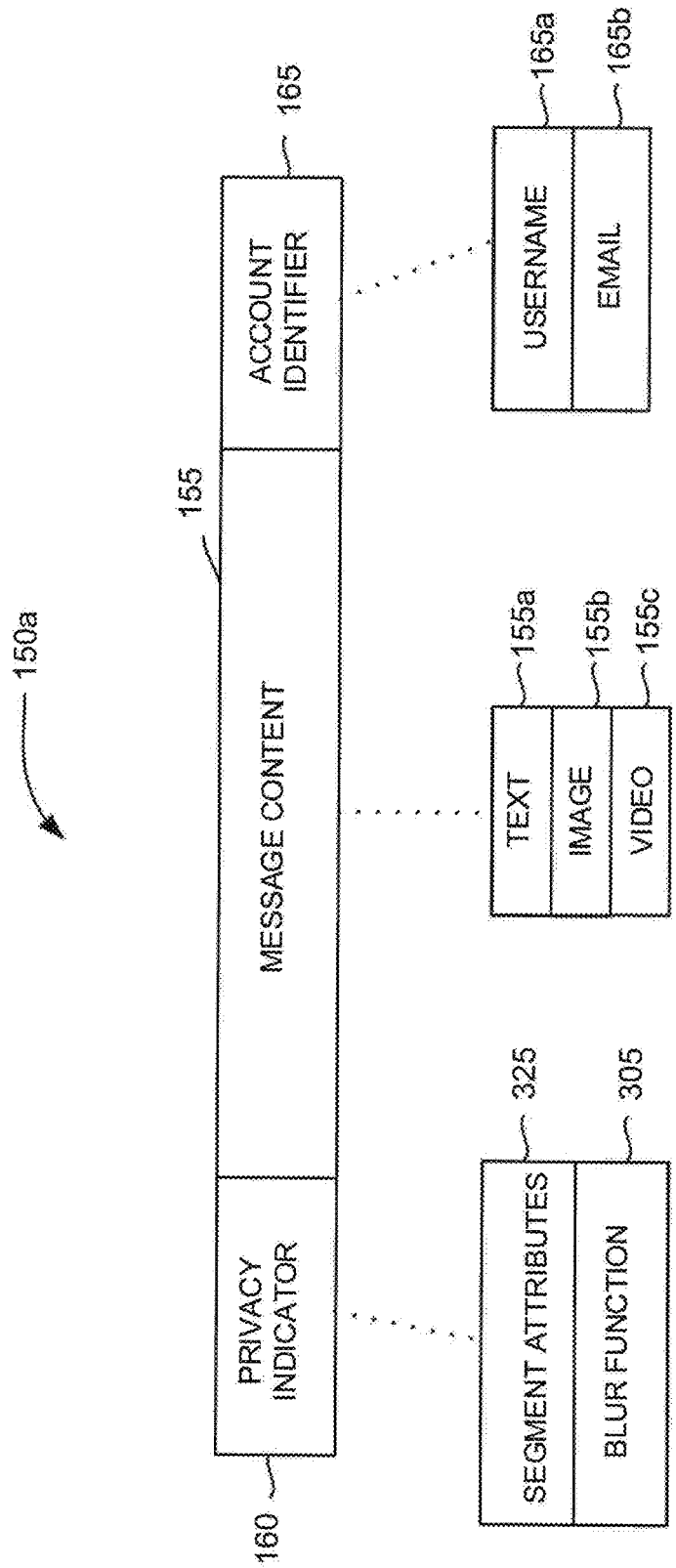
FIG. 1C is a block diagram illustrating a message in accordance with at least one example embodiment.

Reference is next made to FIG. 1C, which illustrates an example embodiment of message 150a. Message 150a comprises message content 155 and privacy indicator 160. Message content 155 includes any content such as a text 155a, and image 155b, or video 155c. Privacy indicator 160 is based on at least one segment attribute 325 and blur function 305. In some embodiments, account identifier 165 may include, for example, a username 165a or an email address 165b. Account identifier 165 may comprise any suitable identifier that associates a user with the messaging service.

Figure 2:
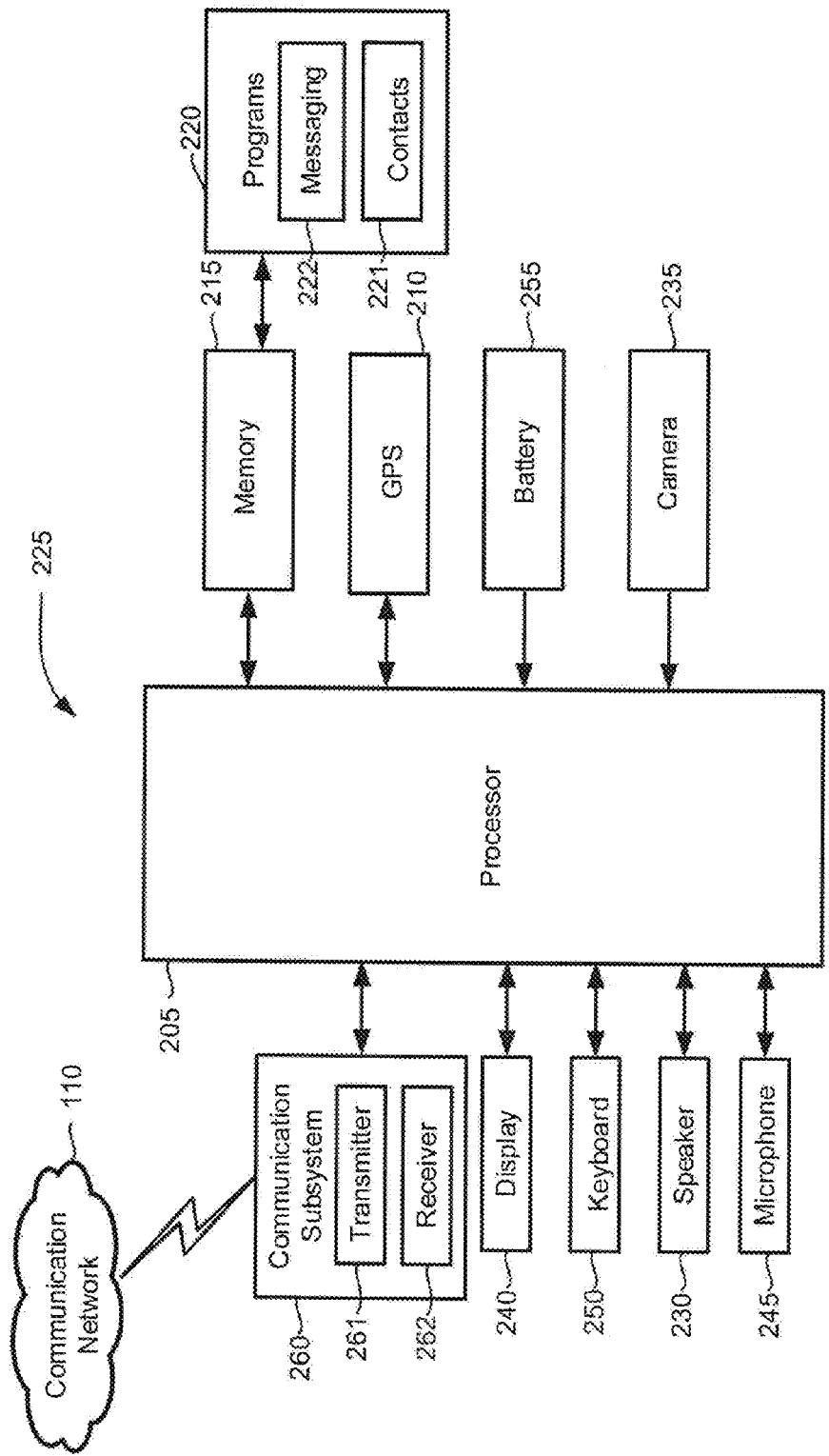
FIG. 2 is a block diagram illustrating a device in accordance with at least one example embodiment.

Reference is next made to FIG. 2, which illustrates an example embodiment of an electronic device 225. Electronic device 225 generally includes a number of components, in particular a processor 205, memory 215 and communication subsystem 260, a GPS module 210, battery 255, display 240, keyboard 250, speaker 230, camera 235 and microphone 245.

Communication subsystem 260 comprises a radio transmitter 261 and receiver 262 to send and receive data, respectively, and may comprise an antenna (not shown) for connecting to communication network 110.

Memory 215 may store computer executable code in the form of programs or modules 220, including a contacts module 221, messaging module 222, and operating system software (not shown) that allow the user of the electronic device to send and receive data. Memory 215 may be volatile memory (also referred to as temporary storage) or non-volatile memory.

GPS module 210 is a receiver for the Global Positioning System (or equivalent, such as GLONASS or Galileo), and is configured to provide navigation and geographical positioning data.

Processor 205 executes the computer executable code stored in memory 215 and generally interacts with the display 240, keyboard 250, speaker 230, and microphone 245 to provide communication related functions, such as entering a message for delivery over the communication network 110 or program functions such as displaying the user's contacts. Keyboard 250 may comprise, for example, a physical buttons or a touchscreen keyboard for entering text. Display 240 may comprise any touchscreen technology, such as resistive, capacitive, or surface acoustic wave technology.

Speaker 230 may generate audio signals, for example, when the mobile device is used as a telephone handset. Microphone 245 may, for example, capture audio signals when the mobile device is used to record dictation or used to convert audio signals to electrical signals when the device is used as a telephone handset. Battery 255 may comprise, for example, a lithium ion battery for providing power to the mobile device. Camera 235 may be used to take pictures or to record video on the communication device. In some embodiments, camera 235 may be used for authenticating the identity of the receiver by continuously comparing the face image associated with the receiver's account with the face of the receiver accessing the message.

Figure 4:
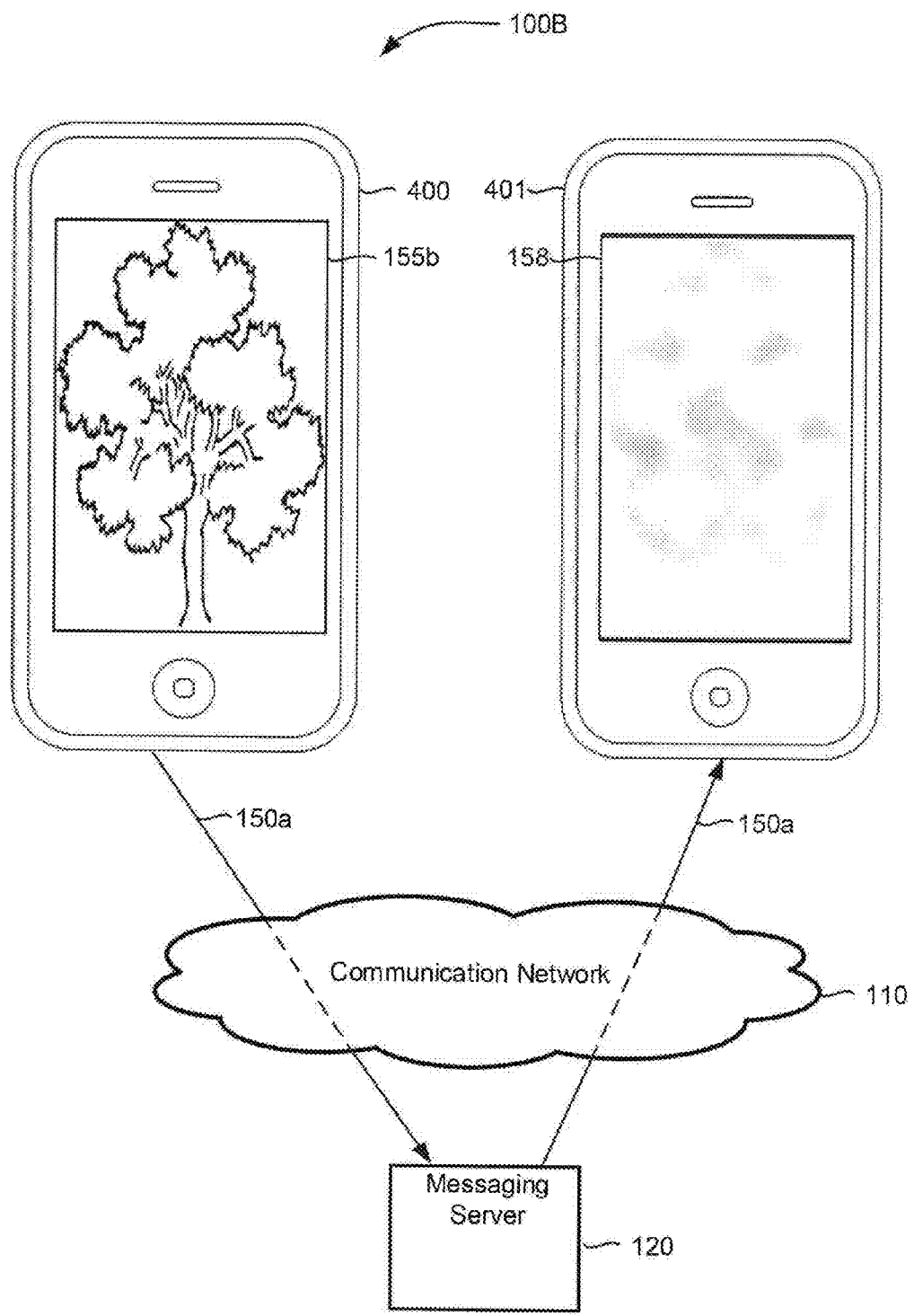
FIG. 4 is a block diagram illustrating a messaging system in accordance with at least one example embodiment.

Reference is next made to FIG. 4, which illustrates an example embodiment of system 100B. System 100B comprises a sender's electronic device 400 transmitting message 150a to a receiver's electronic device 401 over communication network 110. Message 150a comprises message content 155, privacy indicator 160, and account identifier 165 corresponding to a user of the messaging service. Messaging server 120 receives message 150a from the sender's electronic device 400 and correlates the account identifier 165 with the device identifier corresponding to the receiver's electronic device 401. As noted above, a device identifier may include a mobile directory number (MDN), mobile identification number (MIN), international mobile subscriber number (IMSI), electronic serial number (ESN) or the like. Messaging server 120 may contain a database stored on memory, wherein the database comprises at least two fields to correlate an account identifier 165 with a device identifier.

Message 150a is routed to the receiver's electronic device 401 by messaging server 120. In this embodiment, message content 155 consists of an image 155b. When message content 155 is received by the receiver's electronic device, it is stored in an encrypted format in the temporary storage of the electronic device 401 and cannot be viewed or accessed by the receiver.

The receiver's electronic device 401 generates a content image from message content 155. In some embodiments, the content image is generated by converting message content 155a-155c into an image. For example, if message content 155 consists of text 155a, text 155a is converted into an image to generate a content image. If message content 155 consists of video 155c, a frame of video 155c is converted into an image to create a content image. If message content 155 is an image 155b, the image 155b is used as the content image.

The content layer is generated by partitioning the content image into one or more segments based on the segment attributes 325 of privacy indicator 300 at the receiver's electronic device 401. The content layer is stored on temporary storage of the receiver's device, and cannot be viewed by the receiver. The co-ordinates and/or boundaries of the content layer 159 and each segment of the content layer 159 that correspond to an area of the display 240 are stored in the temporary storage of the receiver's electronic device 401. Once the electronic message 150a has been accessed by the receiver, it cannot be re-accessed. In other words, once the electronic message 150a has been closed by the receiver, it is removed from the temporary storage on the electronic device A blur function 305 is applied to content image to generate a blurred content image. The blurred content image is then used to generate an obscured layer 158, which is stored as a separate image in temporary storage of the receiver's electronic device 401. The obscured layer 158 is viewable on the display 240 of the receiver's electronic device 401.

In some embodiments, the receiver must be signed into the messaging service with the account identifier and corresponding password in addition to being authenticated using facial recognition before gaining access to the message 150a. Facial recognition compares the receiver's face captured by camera 235 with an image of the receiver's face stored on the receiver's electronic device 401. The image of the receiver's face may be stored on the device memory 215.

Figure 5:
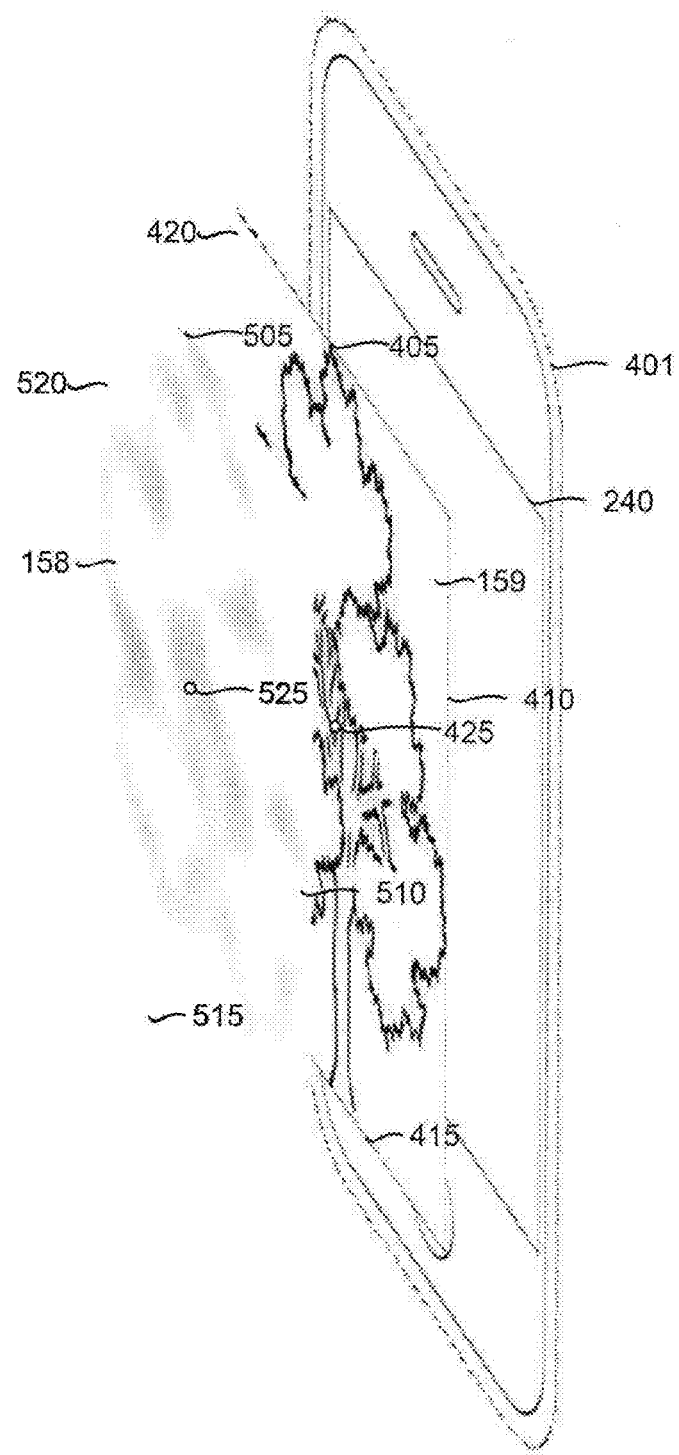
FIG. 5 is a block diagram illustrating a message on a device in accordance with at least one example embodiment.

Reference is next made to FIG. 5, which illustrates an expanded view of the obscured layer 158 aligned with content layer 159 on display 240. One or more coordinates and/or boundaries of the content layer 159 are stored on the temporary storage of the receiver's electronic device 401. The coordinates and/or boundaries of the content layer 159 are used to correlate an area on display 240 corresponding to the one or more coordinates and/or boundaries of the content layer 159. Such coordinates and/or boundaries are also used to align the obscured layer 158 with the content layer 159, and correlate an area on the obscured layer 158 with a corresponding area on display 240.

The uppermost edge of content layer 159 corresponds to the top boundary 405 of content layer 159. The lowermost edge of content layer 159 corresponds to the bottom boundary 415 of content layer 159. The leftmost edge of the content layer 159 corresponds to the left boundary 420 and the rightmost edge of the content layer 159 corresponds to the right boundary 410 of the content layer 159.

Similarly the uppermost edge of obscured layer 158 corresponds to the top boundary 505 of obscured layer 159. The lowermost edge of the obscured layer 158 corresponds to the bottom boundary 515 of obscured layer 158. The leftmost edge of obscured layer 158 corresponds to the left boundary 520 of obscured layer 158, and the rightmost edge of obscured layer 158 corresponds to the right boundary 510 of obscured layer 158.

In some embodiments, the obscured layer 158 is aligned with the content layer 159 by aligning one or more corresponding boundaries. For example, the top boundary 505 on the obscured layer is aligned with the top boundary 405 of the content layer 159. The bottom boundary 515 of the obscured layer 158 is aligned with the bottom boundary 415 of the content layer 159. The left and right boundaries, 520 and 510, of the obscured layer 158 are aligned with the left and right boundaries, 420 and 410, of the content layer 159 respectively.

In other embodiments, the one or more coordinates and/or boundaries can be used to align obscured layer 158 with the content layer 159. For example, coordinate 425 corresponds to the center point of content layer 159, and coordinate 525 corresponds to the center point of obscured layer 158. The obscured layer 158 can be aligned with the content layer 159 by aligning the center coordinate 525 of obscured layer 158 with the center coordinate 425 of content layer 159.

Figure 6:
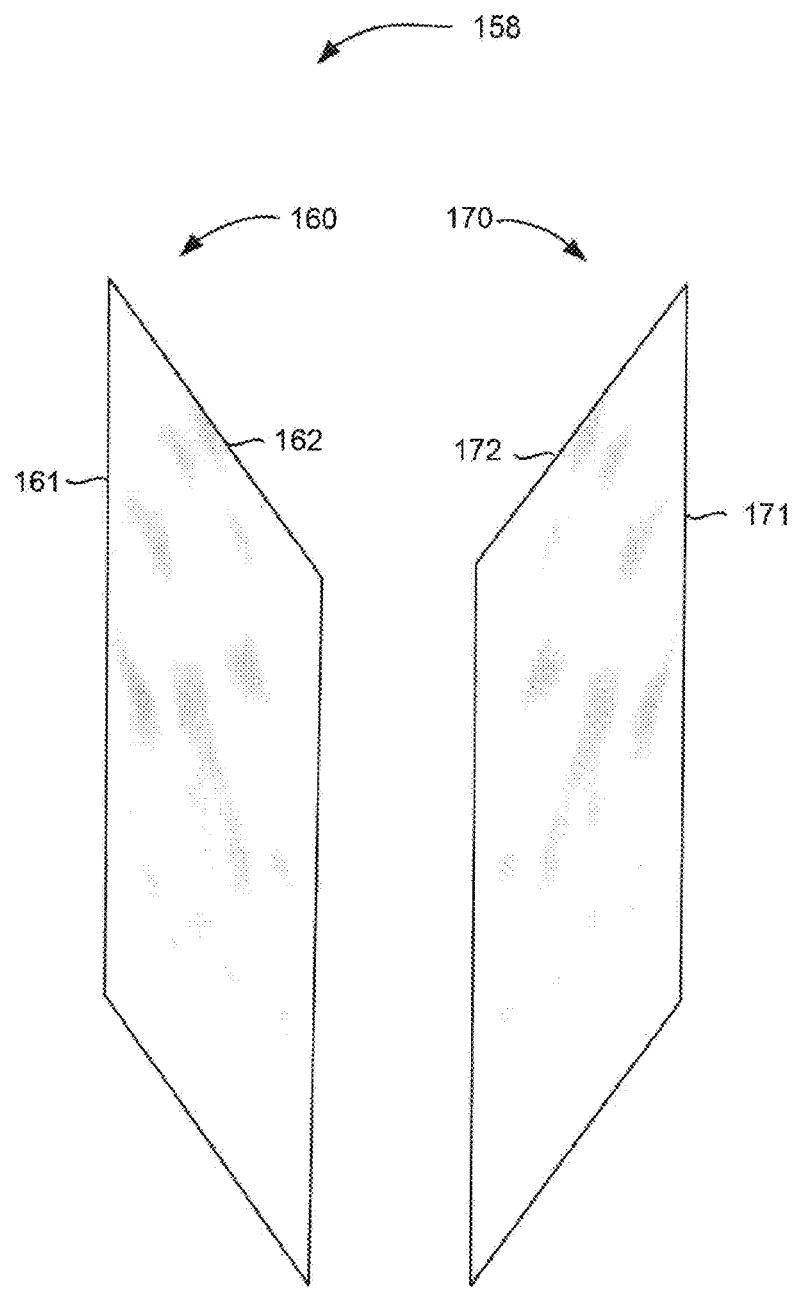
FIG. 6 is a block diagram illustrating an obscured layer in accordance with at least one example embodiment.

Reference is next made to FIG. 6, which illustrates an expanded view of the obscured layer 158. The obscured layer 158 comprises a first face 160 and a second face 170. The first face comprises a front side 161 and a rear side 162. Similarly, the second face comprises a front side 171 and a rear side 172. In some embodiments, the front side 161 of the first face 160 consists of the blurred content image 157, and the rear side 172 of the second face 170 consists of a mirror image of the front side 161 of the first face 160. In other embodiments, the front side 161 of the first face 160 and rear side 171 of the second face may each comprise an opaque image. The obscured layer 158 is generated by abutting the rear side 162 of the first face 160 with the rear side 172 of the second face 170.

Figure 3:
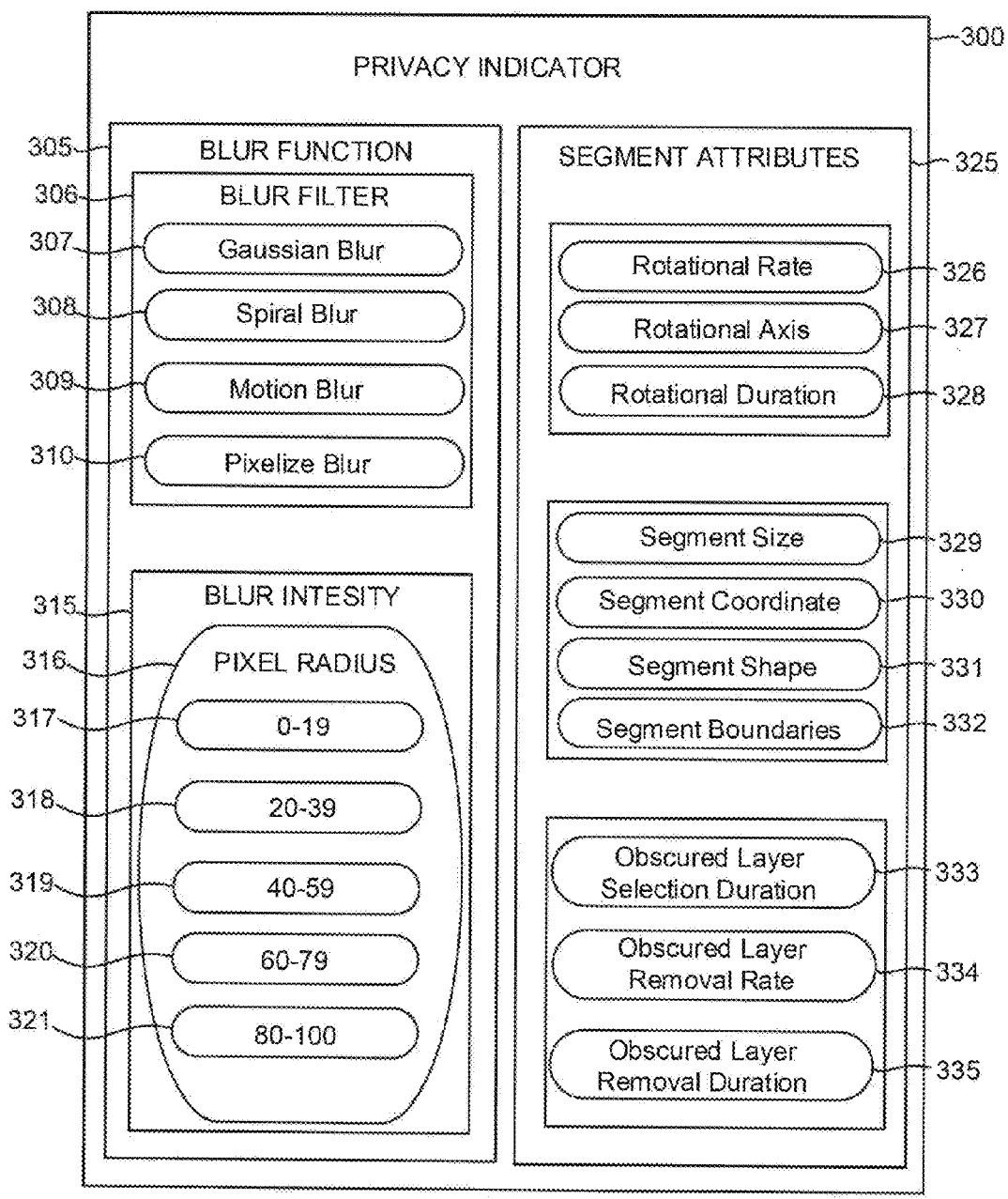
FIG. 3 is a block diagram illustrating privacy indicator in accordance with at least one example embodiment.

Reference is now made to FIG. 3, which illustrates an example embodiment of a privacy indicator 300. Privacy indicator 300 is based on a blur function 305 and at least one segment attribute 325. Blur function 305 includes a blur filter 306 and blur intensity 315. Examples of a blur filter 305 include a Gaussian blur 307, spiral blur 308, motion blur 309, pixelize blur 310, or any other suitable blur filter. Each blur filter creates a different visual effect by manipulating the content image.

For example, a motion blur 309 creates a sense of motion that may be linear, radial, or rotational. A pixelize blur 310 creates a blur effect by transforming the message content into a plurality of large square pixels. A spiral blur 308 creates a blur effect that appears to center towards a focal point of the image. A Gaussian blur 307 creates a blur effect that appears as though the image is viewed through a translucent screen.

The blur intensity 315 can be altered by varying the pixel radius 316 between values of 1-100. Increasing the pixel radius 316 increases the number of surrounding or overlapping pixels that each pixel utilizes to increase blur intensity. A first range 317 of pixel radius is between 1-19, a second range 318 of pixel radius is between 20-39, a third range 319 of pixel radius is between 40-59, a fourth range 320 of pixel radius is between 60-79, and a fifth range 321 of pixel radius is between 80-100.

Segment attributes 325 are selectable by the sender of the message. Segment attributes 325 allow the sender to vary the user experience of the receiver of the message. Example segment attributes include rotational rate 326, rotational axis 327, rotational duration 328, segment size 329, segment coordinates 330, segment shape 331, segment boundaries 332, obscured layer selection duration 333, obscured layer removal rate 334, and obscured layer removal duration 335.

Segment size 329 permits the sender to vary segment size, for example, as large, medium, or small segments. A small segment size partitions the content layer 159 into a higher number of segments, providing a higher degree of visual privacy. A large segment size partitions the content layer 159 into a lower number of segments, providing a lower degree of visual privacy.

Segment coordinates 330 generally relate to the position of the segment on the content layer 159 and accordingly the segment position on display 240. Segment coordinates 330 allow the sender to specify the position of each segment based on a coordinate. For example, specifying segment coordinate 330 as (0,0) positions the segment at the center of the content layer 159 and accordingly, at the center of display 240.

Similar to segment coordinates 330, segment boundaries 332 also relate to the segment position on the content layer 159, and accordingly the segment position on the display 240. Segment boundaries 332 allow the sender to specify the position of each segment based on one or more segment boundaries. For example, a sender may specify the uppermost and left segment boundaries 332 to correspond to the uppermost and left content layer 159 boundary.

Segment shape 331 generally relates to the geometric shape of the segment. Examples of a segment shape 331 include a square, rectangle, circle, hexagon, octagon, etc.

Rotational rate 326 refers to the number of revolutions per unit of time (e.g., revolutions per second) of an area on the obscured layer corresponding to one or more segments selected by the receiver on display 240. A higher rotational rate limits the receiver's ability to view content layer 159. The area on the obscured layer 158 corresponding to the one or more segments selected by the receiver on display 240 rotates at the specified rotational rate 326, which limits the amount of time the content layer 159 is viewable to the receiver for that segment. Conversely, a lower rotational rate 326 increases the amount of time the segment of the content layer 159 is viewable by the receiver. Rotational rates 326 can be specified by the sender as a specific rate, for example, as two revolutions per second.

Alternatively, the rotational rate 326 can be categorized as high, medium, or low. A low rotational rate 326 may include a range between 1-10 revolutions per second, a medium rotational rate may include a range between 11-20 revolutions per second, and a high rotational rate 326 may include a range between 21-30 revolutions per second.

Rotational axis 327 generally refers to the axis upon which the area on the obscured layer corresponding to one or more segments selected by the receiver on display 240 rotates. For example, rotational axis 327 may include a north-south axis, an east-west axis, a north-west and south-east axis, and a north-east and south-west axis.

Rotational duration 328 generally refers to the length of time the area on the obscured layer corresponding to one or more segments selected by the receiver on display 240 rotates. Rotational duration 328 can be specified in any unit of time, such as, milliseconds, seconds, or minutes. The sender can select a shorter rotational duration 328 to rotate the area on the obscured layer corresponding to one or more selected segments for a shorter length of time, thereby increasing the visual privacy provided to message 150a. Conversely, the sender may select a longer rotational duration 328 to reduce the visual privacy provided to message 150a, for example, for a trusted receiver.

Obscured layer selection duration 333 generally refers to the length of time an area on the obscured layer 168 corresponding to one or more segments of content layer 159 is selected on display 240. In some embodiments, obscured layer selection duration 333 may be specified in units of time, for example, milliseconds, seconds, or minutes. In other embodiments, obscured layer selection duration 333 may be specified as continuous, where the area on the obscured layer 158 corresponding to one or more segments of content layer 159 is continuously selected on display 240.

Obscured layer removal rate 334 generally refers to the rate at which the obscured layer is removed when an area on the obscured layer 158 corresponding to one or more segments of content layer 159 is selected on display 240. For example, the obscured layer removal rate 334 may be specified as a numerical value between 0 and 10, where increasing the numerical value increases the rate in which the obscured layer 158 is removed when the area on the obscured layer 158 corresponding to one or more segments of content layer 159 is selected on display 240. For example a sender may wish to set the obscured layer removal rate 334 as zero for one or more segments, in which case the obscured layer 158 is not removed when the area on the obscured layer 158 corresponding to one or more segments of content layer 159 is selected on display 240.

Obscured layer removal duration 335 generally refers to the length of time an area on the obscured layer 158 corresponding to one or more segments of content layer 159 is removed. Obscured layer removal duration 335 can be specified in any unit of time, such as, milliseconds, seconds, or minutes.

The sender can select a shorter obscured layer removal duration 335 to remove the area on the obscured layer corresponding to one or more selected segments for a shorter length of time, thereby increasing the visual privacy provided to message 150a. Conversely, the sender may select a longer obscured layer removal duration 335 to reduce the visual privacy provided to message 150a, for example, for a trusted receiver.

Each of the segment attributes 325 noted above may be implemented alone or in combination allowing the sender to vary the user experience of the receiver viewing a message. Each segment has one or more segment attributes, and can operate independently of one another.

Figure 7A:
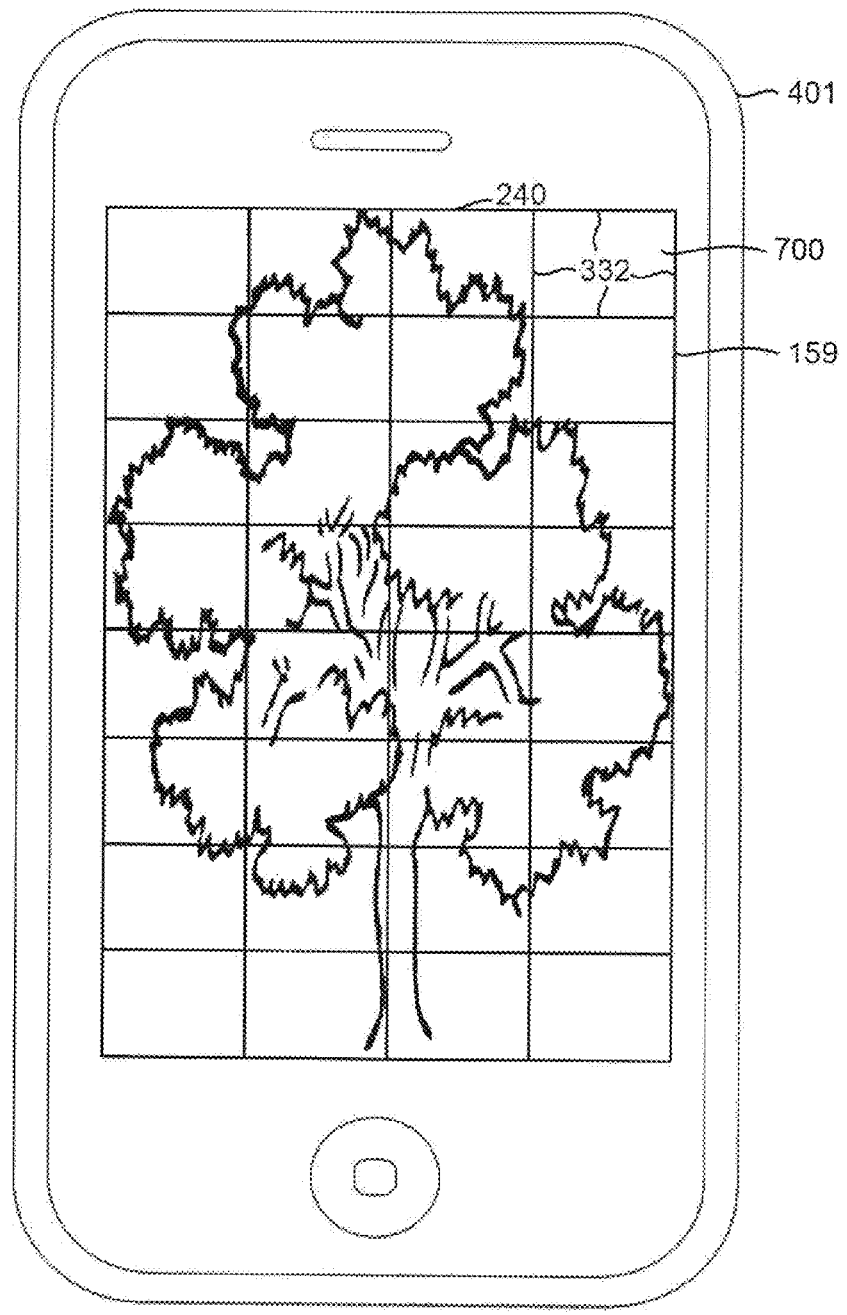
FIG. 7A is a block diagram illustrating a content layer in accordance with at least one example embodiment.

Reference is next made to FIG. 7A, which illustrates an example embodiment of content layer 159 and one or more segments each having at least one segment attribute 325. In this example embodiment segment 700 has the following segment attributes 325: segment size 329 is set as small, segment shape 331 is set as rectangle, and four segment boundaries 332.

Figure 7B:
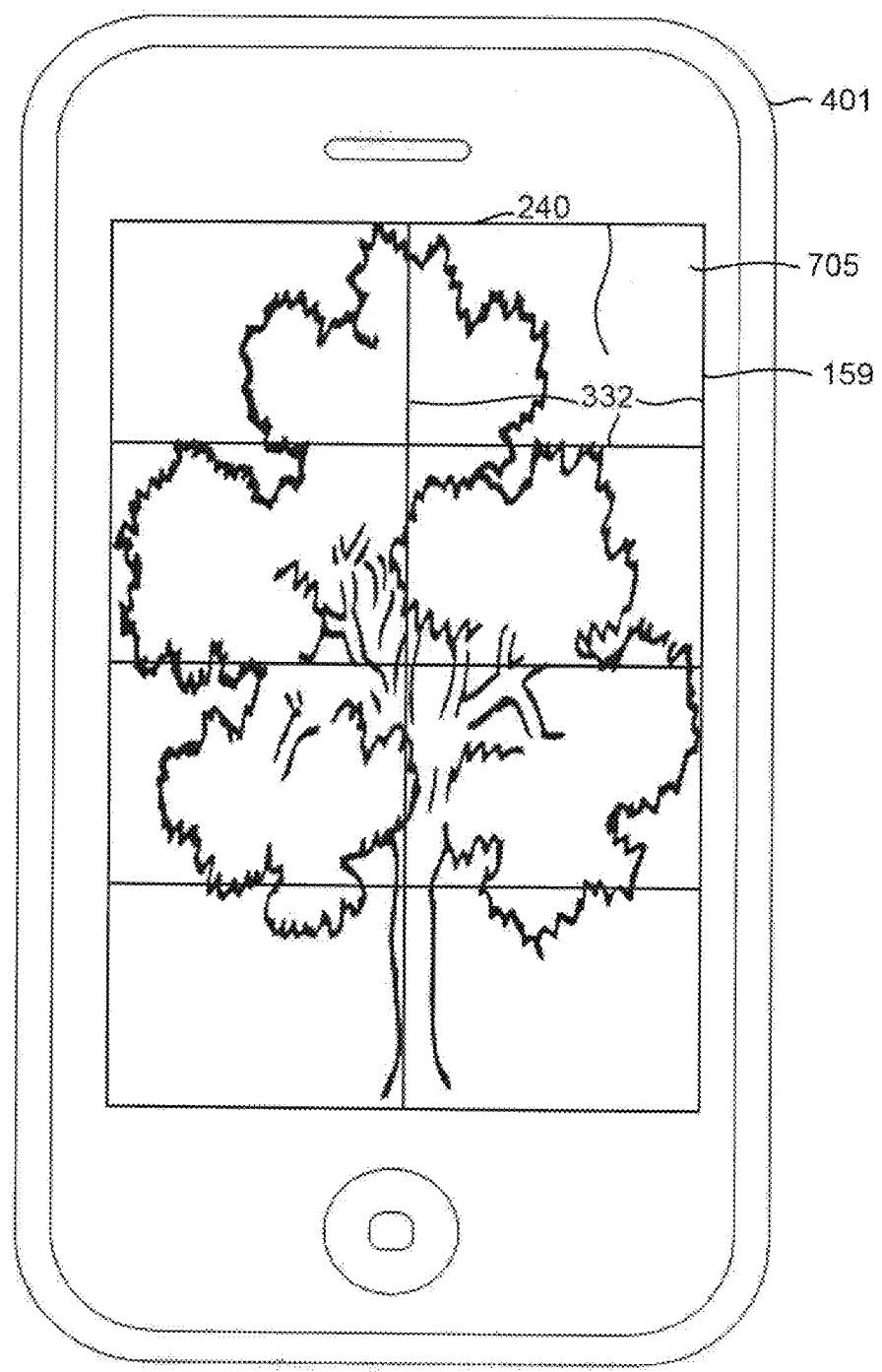
FIG. 7B is a block diagram illustrating a content layer in accordance with at least one example embodiment.

Reference is made to FIG. 7B, which illustrates another example embodiment of content layer 159 and one or more segments each having at least one segment attribute 325. In this example embodiment segment 705 has the following segment attributes 325: segment size 329 is set as medium, segment shape 331 is set as rectangle, and four segment boundaries 332.

Figure 7C:
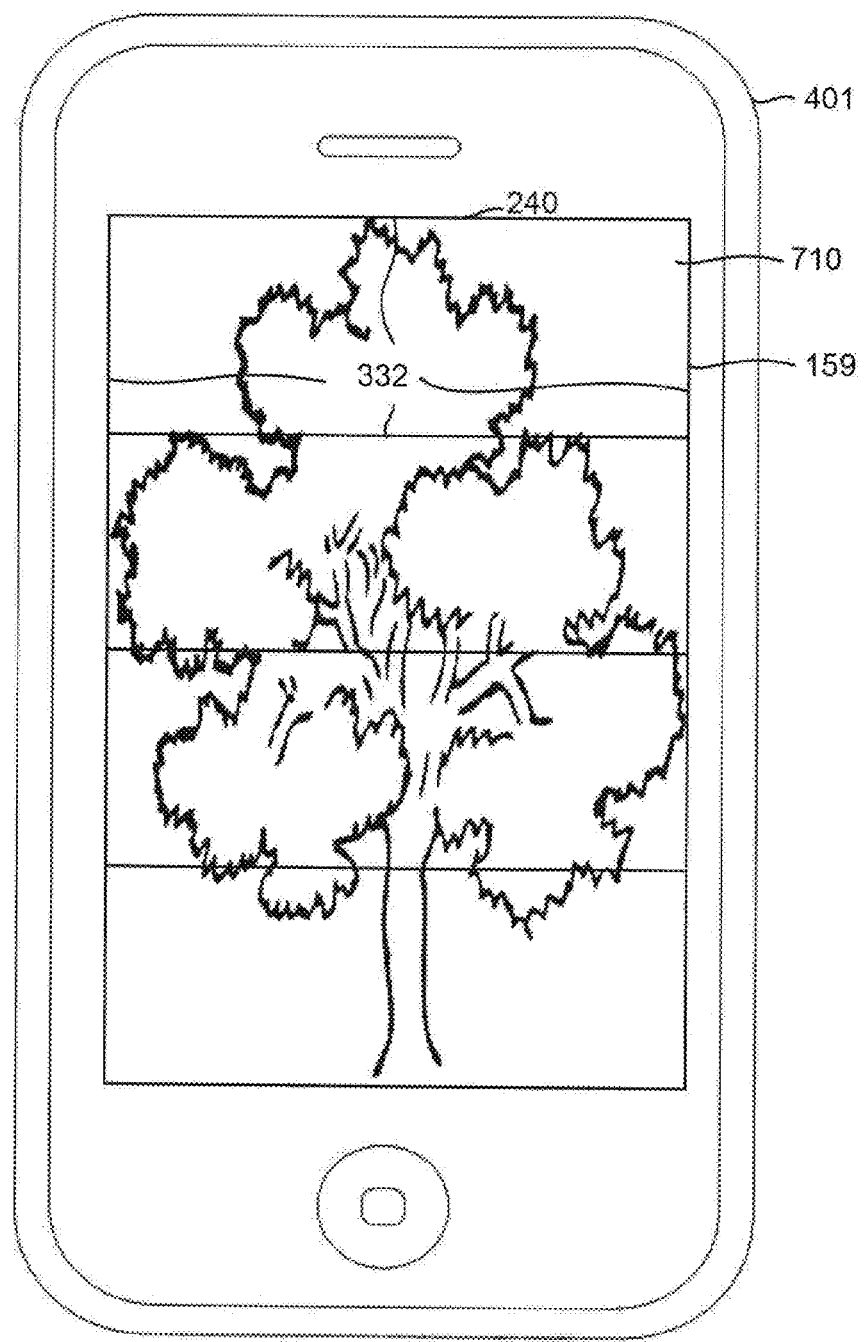
FIG. 7C is a block diagram illustrating a content layer in accordance with at least one example embodiment.

Reference is made to FIG. 7C, which illustrates another example embodiment of content layer 159 and one or more segments each having at least one segment attribute 325. In this example embodiment segment 710 has the following segment attributes 325: segment size 329 is set as large, segment shape 331 is set as rectangle, and four segment boundaries 332.

Figure 7D:
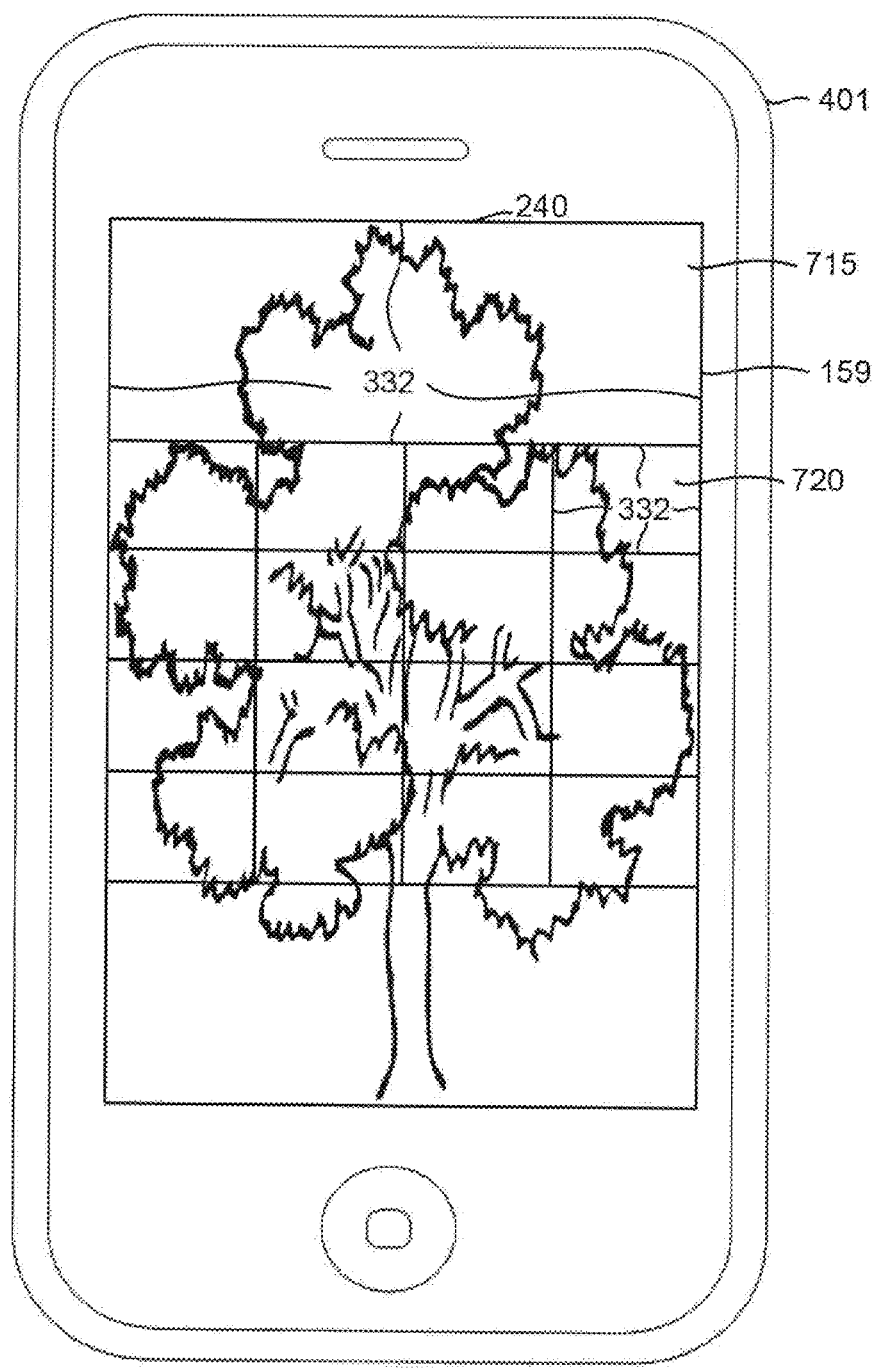
FIG. 7D is a block diagram illustrating a content layer in accordance with at least one example embodiment.

Reference is made to FIG. 7D, which illustrates another example embodiment of content layer 159 and one or more segments each having at least one segment attribute 325. In this example embodiment segment 715 has the following segment attributes 325: segment size 329 is set as large, segment shape 331 is set as rectangle, and four segment boundaries 332. Segment 720 has the following segment attributes 325: segment size 329 is set as small, segment shape 331 is set as rectangle, and four segment boundaries 332.

Figure 7E:
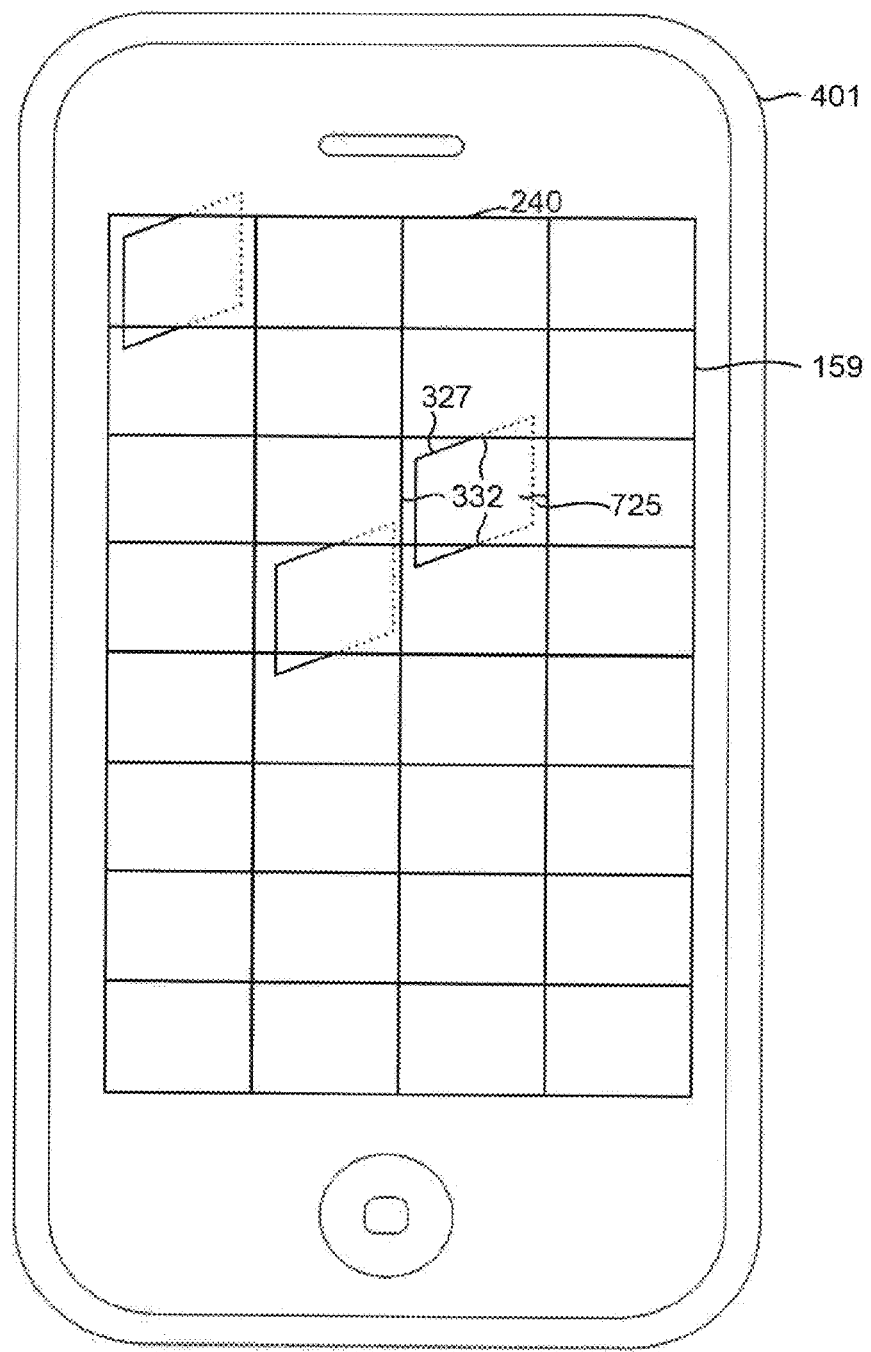
FIG. 7E is a block diagram illustrating a content layer in accordance with at least one example embodiment.

Reference is made to FIG. 7E, which illustrates another example embodiment of content layer 159 and one or more segments each having at least one segment attribute 325. In this example embodiment segment 725 has the following segment attributes 325: segment size 329 is set as small, segment shape 331 is set as rectangle, four segment boundaries 332, and rotational axis 327 is set as north-south.

Figure 7F:
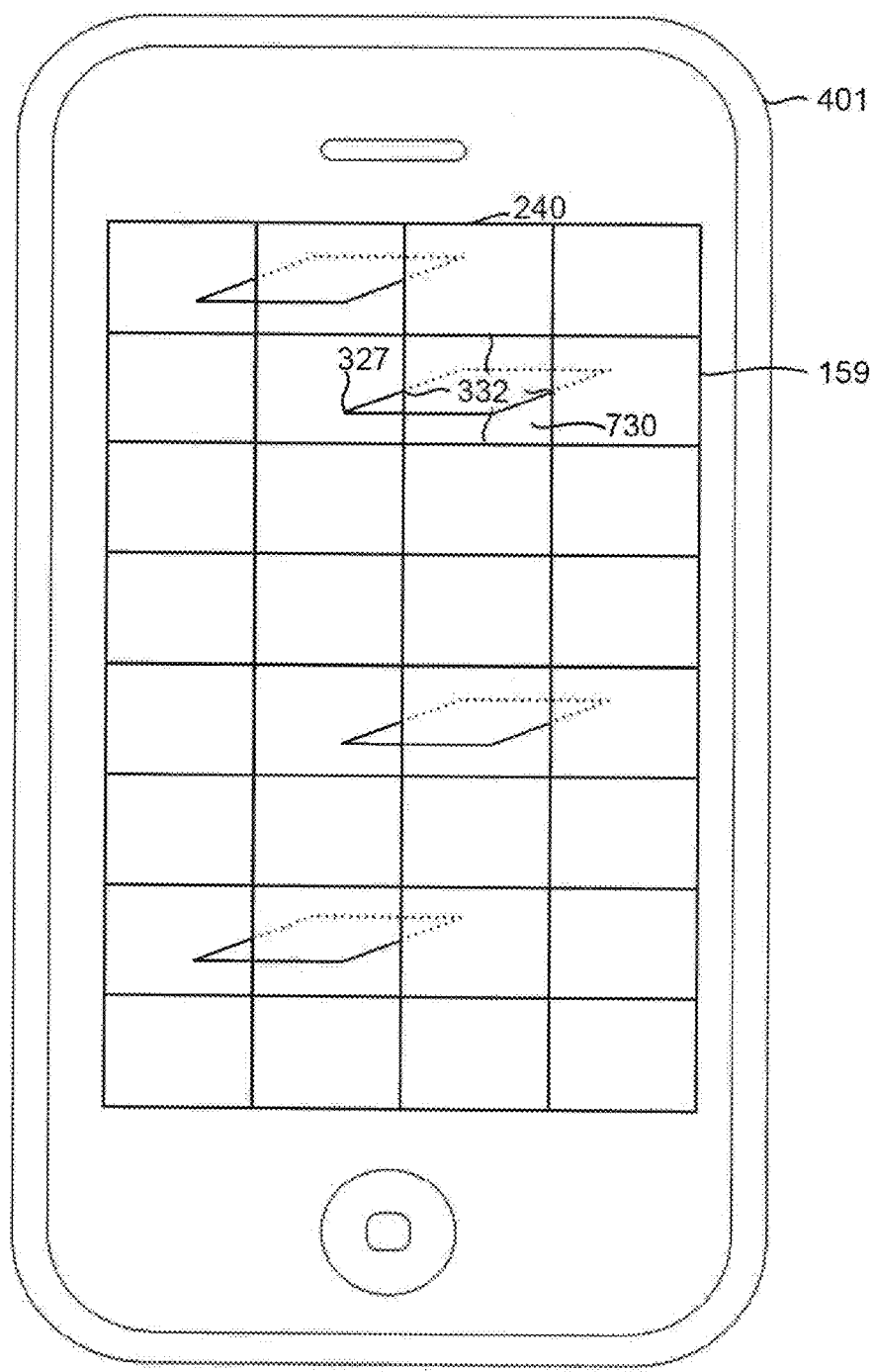
FIG. 7F is a block diagram illustrating a content layer in accordance with at least one example embodiment.

Reference is made to FIG. 7F, which illustrates another example embodiment of content layer 159 and one or more segments each having at least one segment attribute 325. In this example embodiment segment 730 has the following segment attributes 325: segment size 329 is set as small, segment shape 331 is set as rectangle, four segment boundaries 332, and rotational axis 327 is set as east-west.

Figure 7G:
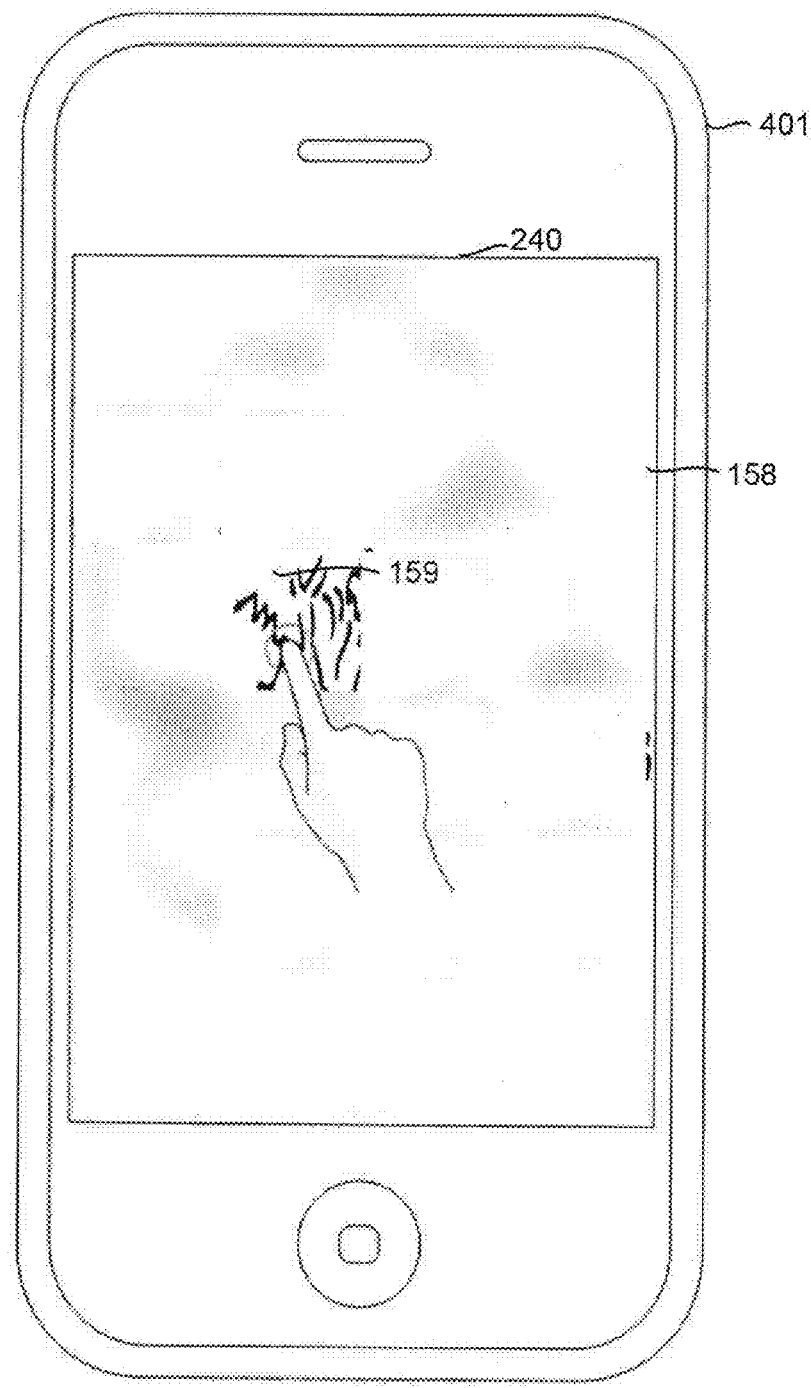
FIG. 7G is a block diagram illustrating a content layer and an obscured layer in accordance with at least one example embodiment.

Reference is next made to FIG. 7G, which illustrates an example embodiment of an area on the obscured layer 158 being removed when the area on the obscured layer 158 corresponding to one or more segments of content layer 159 is selected on display 240. In this embodiment, some of the segment attributes 325 include: segment size 329 set to small; segment shape set to square; obscured layer selection duration 333 set to continuous; and the obscured layer removal rate 334 set to 5.

Figure 7H:
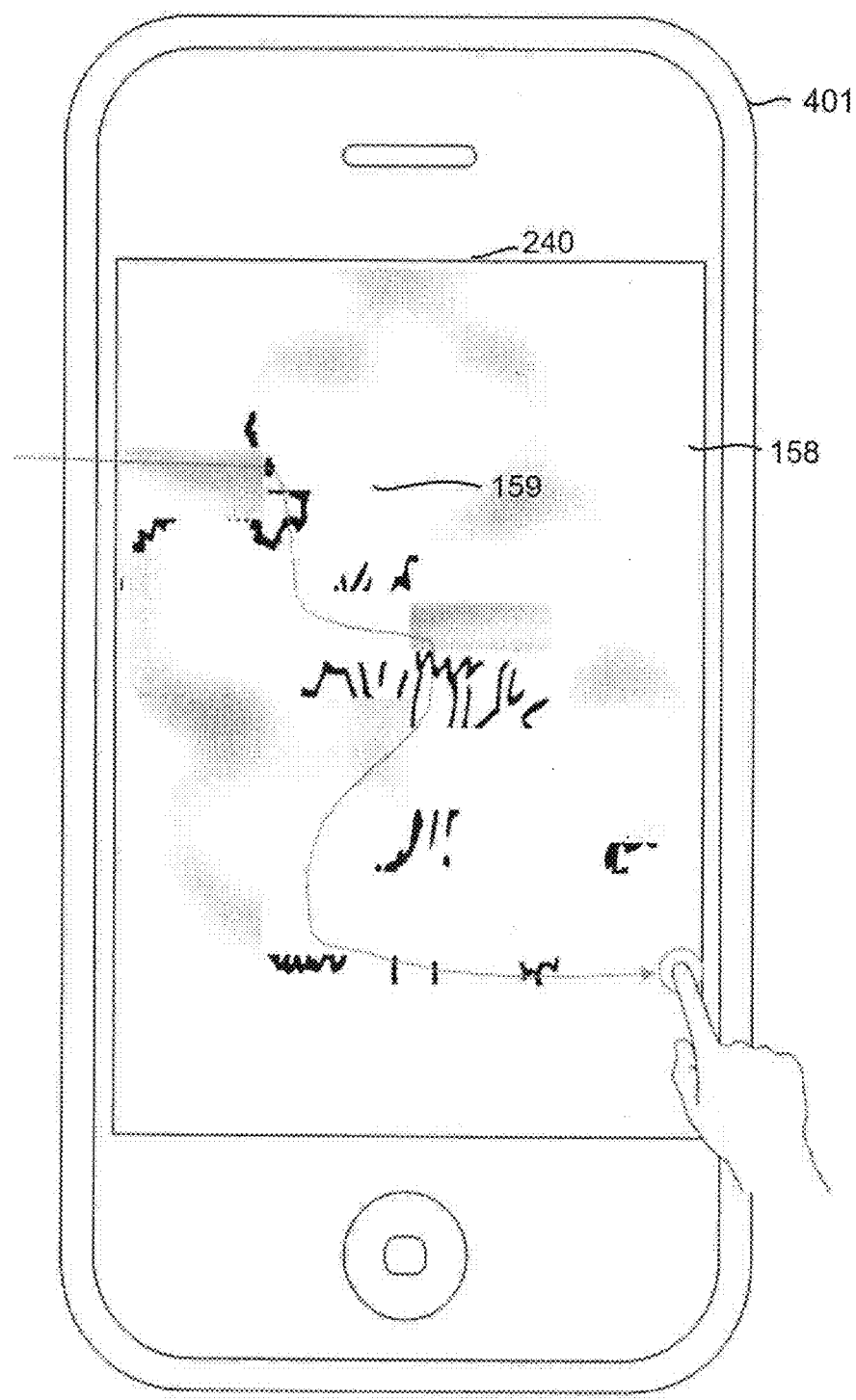
FIG. 7H is a block diagram illustrating a content layer and an obscured layer in accordance with at least one example embodiment.

Reference is next made to FIG. 7H, which illustrates an example embodiment of an area on the obscured layer 158 being removed when an area on the obscured layer 158 corresponding to one or more segments of content layer 159 is selected on display 240. In this embodiment, some of the segment attributes 325 include: segment size 329 set to small; segment shape set to square; rotational axis 327 set to east-west; and rotational rate 326 set to ten revolutions per second.

In some embodiments, a receiver may wish to increase the visual privacy of an electronic message 150a. For example, a sender may select segment size 329 as large, rotational rate 326 as one revolution per second. The receiver of the electronic message 150a may be in a crowded location and may wish a higher degree of visual privacy. The receiver may change the segment size 329 to small and set the rotational rate 326 to ten revolutions per second.

The present invention has been described here by way of example only. Various modification and variations may be made to these exemplary embodiments without departing from the spirit and scope of the invention, which is limited only by the appended claims.

The invention claimed is:

1. A method of providing visual privacy for a message sent to at least one device, the method comprising:
   receiving the message at the at least one device, the message including content and a privacy indicator;
   converting the content to a content image;
   applying a blur function to the content image to generate a blurred content image;

generating an obscured layer from the blurred content image;
partitioning the content image into one or more segments to generate a content layer, the one or more segments each having one or more segment attributes;
aligning the obscured layer with the content layer, wherein selecting an area on the obscured layer corresponding to the one or more segments removes the obscured layer for the one or more segments based on the one or more segment attributes.

2. The method of claim 1, wherein the obscured layer comprises a first face and a second face, and wherein the first face and second face each comprise a front side and rear side.

3. The method of claim 2, wherein the front side of the first face includes the blurred content image and the front side of the second face is a mirror image of the front side of the first face.

4. The method of claim 3, wherein the obscured layer is generated by abutting the rear side of the first face with the rear side of the second face.

5. The method of claim 1, wherein the privacy indicator is based on the blur function and segment attributes.

6. The method of claim 1, wherein the blur function and the segment attributes are selectable by a sender of the message.

7. The method of claim 1, wherein the privacy indicator can be modified by the receiver of the message.

8. The method of claim 1, wherein the one or more segment attributes comprise at least one of: a rotational rate, a rotational axis, rotational duration, segment size, segment coordinates, segment shape, segment boundaries, obscured layer selection duration, obscured layer removal rate and obscured layer removal duration.

9. The method of claim 8, wherein the rotational axis is selected from a group consisting of: a north-south axis, an east-west axis, a north-west and south-east axis, or a north-east and south west axis.

10. The method of claim 1, wherein the blur function comprises a blur intensity and a blur filter.

11. The method of claim 1, wherein the content is video content, and wherein only a frame of the video content is converted to the content image.

12. The method of claim 1, wherein the blur filter is selected from a group consisting of: a Gaussian blur, a spiral blur, a motion blur, or a pixelize blur.

13. A device configured to receive a message, comprising:
a memory configured to store a message that includes content and a privacy indicator; and
a processor configured to:
convert the content to a content image;
apply a blur function to the content image to generate a blurred content image;
generate an obscured layer from the blurred content image;
partition the content image into one or more segments to generate a content layer, the one or more segments each having one or more segment attributes;
align the obscured layer with the content layer, wherein selecting an area on the obscured layer corresponding to the one or more segments removes the obscured layer for the one or more segments based on the one or more segment attributes.

14. The device of claim 13, wherein the obscured layer comprises a first face and a second face, and wherein the first face and second face each comprise a front side and rear side.

15. The device of claim 14, wherein the front side of the first face includes the blurred content image and the front side of the second face is a mirror image of the front side of the first face.

16. The device of claim 15, wherein the obscured layer is generated by abutting the rear side of the first face with the rear side of the second face.

17. The device of claim 13, wherein the privacy indicator is based on the blur function and segment attributes.

18. The device of claim 13, wherein the privacy indicator is selectable by a sender of the message.

19. The device of claim 13, wherein the privacy indicator can be modified by the receiver of the message.

20. A system of providing privacy for a message transmitted between devices using a communication network, the system comprising:
a sender device configured to transmit the message, the message including content, a privacy indicator, and at least one account identifier;
at least one server configured to:
receive the message from the sender device, the message comprising content, a privacy indicator, and at least one account identifier;
route the message from the sender device to the at least one receiver device based on the at least one account identifier;
receive an acknowledgement receipt from the receiver device;
at least one receiver device configured to:
receive the message;
transmit an acknowledgment receipt;
convert the content to a content image;
apply a blur function to the content image to generate a blurred content image;
generate an obscured layer from the blurred content image;
partition the content image into one or more segments to generate a content layer, the one or more segments each having one or more segment attributes;
align the obscured layer with the content layer, wherein selecting an area on the obscured layer corresponding to the one or more segments removes the obscured layer for the one or more segments based on the one or more segment attributes.

* * * * *